(12) United States Patent
Morishita et al.

(10) Patent No.: US 11,848,463 B2
(45) Date of Patent: Dec. 19, 2023

(54) POWER STORAGE DEVICE

(71) Applicant: Prime Planet Energy & Solutions, Inc., Tokyo (JP)

(72) Inventors: Taijyu Morishita, Kasai (JP); Wataru Okada, Kobe (JP)

(73) Assignee: PRIME PLANET ENERGY & SOLUTIONS, INC., Tokyo (JP)

(*) Notice: Subject to any disclaimer, the term of this patent is extended or adjusted under 35 U.S.C. 154(b) by 114 days.

(21) Appl. No.: 17/499,869

(22) Filed: Oct. 13, 2021

(65) Prior Publication Data

US 2022/0123420 A1 Apr. 21, 2022

(30) Foreign Application Priority Data

Oct. 20, 2020 (JP) .................. 2020-175798

(51) Int. Cl.
*H01M 50/55* (2021.01)
*H01M 50/209* (2021.01)
*H01M 50/271* (2021.01)
*H01M 50/227* (2021.01)
*H01M 50/238* (2021.01)
*H01M 50/249* (2021.01)
*H01M 50/291* (2021.01)
(Continued)

(52) U.S. Cl.
CPC ......... *H01M 50/55* (2021.01); *H01M 50/209* (2021.01); *H01M 50/227* (2021.01); *H01M 50/238* (2021.01); *H01M 50/242* (2021.01); *H01M 50/249* (2021.01); *H01M 50/271* (2021.01); *H01M 50/291* (2021.01); *H01M 50/293* (2021.01); *H01M 10/0525* (2013.01); *H01M 2220/20* (2013.01)

(58) Field of Classification Search
None
See application file for complete search history.

(56) References Cited

U.S. PATENT DOCUMENTS

| 6,368,743 B1* | 4/2002 | Guerin ................. F15B 15/068 |
| | | 429/159 |
| 2002/0182480 A1* | 12/2002 | Hanauer ............. H01M 50/209 |
| | | 429/62 |

(Continued)

FOREIGN PATENT DOCUMENTS

| CN | 111771294 A | 10/2020 |
| JP | 2003346751 A | 12/2003 |

(Continued)

*Primary Examiner* — Gregg Cantelmo
(74) *Attorney, Agent, or Firm* — HAUPTMAN HAM, LLP

(57) ABSTRACT

Each of a plurality of power storage cells includes an top surface provided with an electrode terminal, a bottom surface opposite to the top surface, and a side surface contiguous to the top surface and the bottom surface. A case includes a main body provided with an opening on the side surface side of the plurality of power storage cells, and a cover provided over the opening. The case has a first inner side surface and a second inner side surface each facing the side surfaces of the plurality of power storage cells. A power storage device includes biasing means for biasing the plurality of power storage cells toward the second inner side surface of the case, the biasing means being provided between the first inner side surface of the case and the plurality of power storage cells.

7 Claims, 4 Drawing Sheets

(51) Int. Cl.
*H01M 50/293* (2021.01)
*H01M 50/242* (2021.01)
*H01M 10/0525* (2010.01)

(56) References Cited

U.S. PATENT DOCUMENTS

| | | | |
|---|---|---|---|
| 2003/0162091 A1* | 8/2003 | Watanabe | H01M 50/124 |
| | | | 429/156 |
| 2010/0144214 A1* | 6/2010 | Kruger | H01M 50/54 |
| | | | 439/761 |
| 2011/0294000 A1* | 12/2011 | Kim | H01M 50/271 |
| | | | 429/177 |
| 2012/0028094 A1 | 2/2012 | Kim et al. | |
| 2012/0045686 A1* | 2/2012 | Jung | H01M 50/264 |
| | | | 429/159 |
| 2012/0115004 A1* | 5/2012 | Park | H01M 50/209 |
| | | | 429/120 |
| 2014/0023906 A1 | 1/2014 | Hashimoto et al. | |
| 2015/0104693 A1 | 4/2015 | Dorsch | |
| 2015/0222131 A1 | 8/2015 | Kano | |
| 2018/0375075 A1 | 12/2018 | Yoshimura et al. | |
| 2019/0312243 A1* | 10/2019 | Maguire | H01M 10/0481 |
| 2020/0381683 A1 | 12/2020 | Shimizu et al. | |
| 2021/0066685 A1 | 3/2021 | Lee et al. | |

FOREIGN PATENT DOCUMENTS

| | | |
|---|---|---|
| JP | 2009134901 A | 6/2009 |
| JP | 2010272378 A | 12/2010 |
| JP | 201228321 A | 2/2012 |
| JP | 201373845 A | 4/2013 |
| JP | 2015520480 A | 7/2015 |
| JP | 2017111893 A | 6/2017 |
| JP | 2019145459 A | 8/2019 |
| JP | 2019192486 A | 10/2019 |
| WO | 2012133708 A1 | 10/2012 |
| WO | 2019163864 A1 | 8/2019 |
| WO | 2019/208185 A1 | 10/2019 |
| WO | 2020145531 A1 | 7/2020 |

* cited by examiner

POWER STORAGE DEVICE

This nonprovisional application is based on Japanese Patent Application No. 2020-175798 filed on Oct. 20, 2020 with the Japan Patent Office, the entire contents of which are hereby incorporated by reference.

BACKGROUND OF THE INVENTION

Field of the Invention

The present disclosure relates to a power storage device.

Description of the Background Art

A battery pack is an exemplary power storage device. Exemplary conventional battery pack structures are described in Japanese Patent Laying-Open No. 2010-272378 (PTL 1), Japanese Patent Laying-Open No. 2009-134901 (PTL 2), WO 2012/133708 (PTL 3), Japanese National Patent Publication No. 2015-520480 (PTL 4), and Japanese Patent Laying-Open No. 2012-28321 (PTL 5).

There is a demand for size reduction and weight reduction by simplifying a structure for restraining a plurality of battery cells. On the other hand, when such a restraining structure is simplified, precision in positioning the plurality of battery cells is decreased due to variation in deformation of the battery cells or the like, thus resulting in positional deviation of terminals of the battery cells.

Each of the structures described in PTL 1 to PTL 5 is not necessarily sufficient to solve the above-described problem. Further, a similar problem may occur in a power storage device other than the battery.

SUMMARY OF THE INVENTION

An object of the present disclosure is to provide a power storage device in which a plurality of power storage cells are precisely positioned.

A power storage device according to the present disclosure includes: a power storage module including a plurality of stacked power storage cells; and a case having an inner space to accommodate the power storage module. Each of the plurality of power storage cells include an top surface provided with an electrode terminal, a bottom surface opposite to the top surface, and a side surface contiguous to the top surface and the bottom surface. The case includes a main body provided with an opening on the side surface side of the plurality of power storage cells, and a cover provided over the opening. The case has a first inner side surface and a second inner side surface each facing the side surfaces of the plurality of power storage cells. The power storage device further includes biasing means for biasing the plurality of power storage cells toward the second inner side surface of the case, the biasing means being provided between the first inner side surface of the case and the plurality of power storage cells.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present disclosure will be described. In the embodiments described below, when reference is made to number, amount, and the like, the scope of the present disclosure is not necessarily limited to the number, amount, and the like unless otherwise stated particularly. Further, in the embodiments described below, each component is not necessarily essential to the present disclosure unless otherwise stated particularly.

Figure 1:
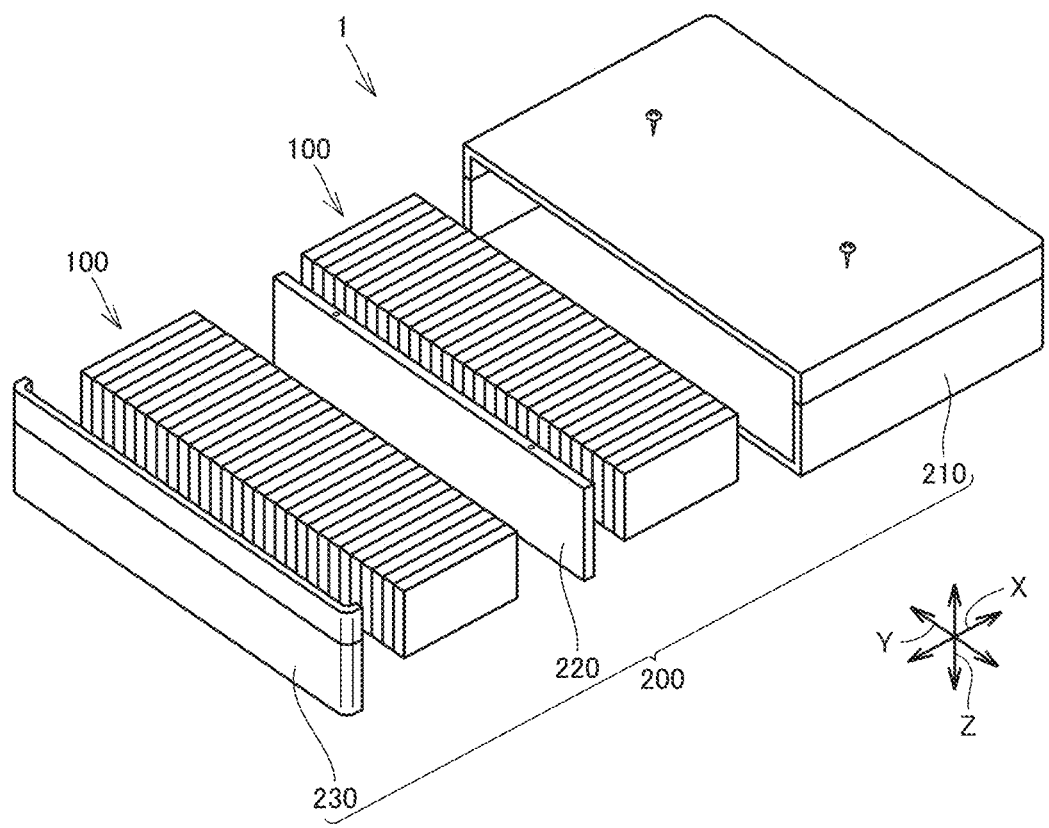
FIG. 1 is an exploded perspective view showing a configuration of a battery pack.

FIG. 1 is an exploded perspective view showing a configuration of a battery pack 1. Battery pack 1 includes battery modules 100 and a case 200.

Each of battery modules 100 (power storage module) includes a plurality of battery cells (power storage cells) stacked along a Y axis direction (stacking direction).

Case 200 includes a case main body 210, a partition member 220, and a cover member 230. Case main body 210 constitutes a top surface of case 200, a bottom surface of case 200, and a portion of a side surface of case 200. Partition member 220 is accommodated in case main body 210 together with battery module 100. Cover member 230 constitutes a portion of the side surface of case 200. Case main body 210 is provided with an opening on the side surface 112D side (see FIG. 2) of battery cells 110 included in battery module 100. Cover member 230 is provided over the opening of case main body 210.

Case 200 has an inner space to accommodate battery modules 100. Each of case main body 210, partition member 220, and cover member 230 may be a casted component (die cast material) composed of a metal material such as aluminum or magnesium, or may be a press-molded component composed of a carbon-containing material. Case 200 is not limited to the above configuration, and may be any case as long as case 200 satisfies predetermined characteristics such as strength, heat radiation, and thermal conductivity. For example, each of case main body 210, partition member 220, and cover member 230 may be composed of a resin.

A joining portion between case main body 210 and cover member 230 may be sealed using a sealing material such as a rubber, an adhesive agent, a hot-melt material, and the like, or case main body 210 and cover member 230 may be joined to each other by ultrasonic welding, laser welding, or the like. Thus, a sealed space is formed inside case 200 including case main body 210, partition member 220, and cover member 230.

Battery pack 1 can be mounted on a vehicle. When battery pack 1 is mounted on a vehicle, case main body 210 and cover member 230 are typically arranged side by side in a horizontal direction (X axis direction). In the present specification, the X axis direction may be also referred to as "leftward/rightward direction".

Figure 2:
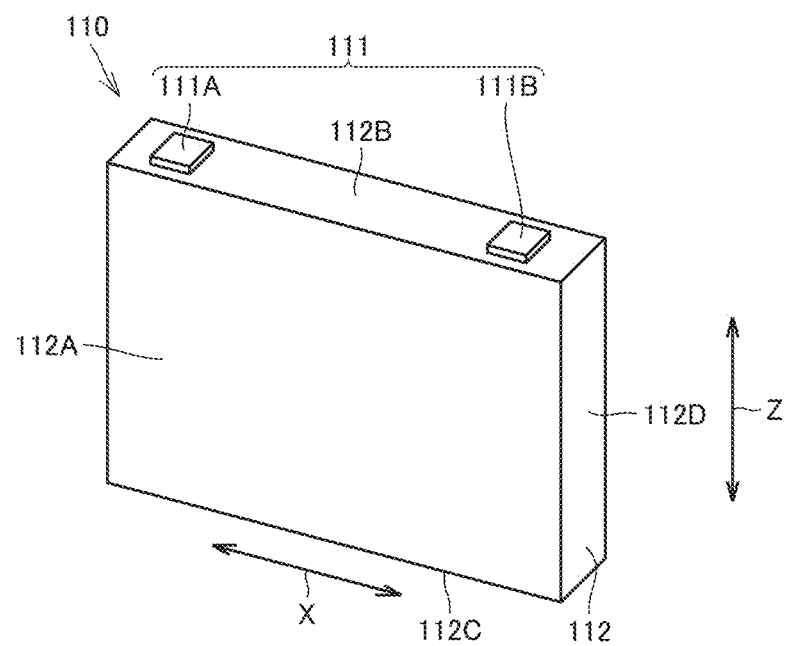
FIG. 2 is a diagram showing a battery cell included in a battery module.

FIG. 2 is a diagram showing battery cell 110 included in battery module 100. As shown in FIG. 2, battery cell 110 includes an electrode terminal 111 and an accommodation case 112 (housing). Electrode terminal 111 includes a positive electrode terminal 111A and a negative electrode terminal 111B. Electrode terminal 111 is formed on accommodation case 112. An electrode assembly and an electrolyte solution (not shown) are accommodated in accommodation case 112.

Accommodation case 112 is formed to have a flat rectangular parallelepiped shape. That is, battery cell 110 is a prismatic cell. Accommodation case 112 has: a main surface 112A extending along an X-Z plane; a top surface 112B and a bottom surface 112C each extending along an X-Y plane; and a side surface 112D extending along a Y-Z plane. Electrode terminal 111 is provided on top surface 112B. Bottom surface 112C is opposite to top surface 112B. Side surface 112D is contiguous to top surface 112B and bottom surface 112C.

As an example, battery cell 110 is a lithium ion battery. Battery cell 110 may be another battery such as a nickel-metal hydride battery. Further, in the present disclosure, the "power storage module" is not limited to battery module 100, and a capacitor may be used as the "power storage cell" instead of battery cell 110, for example.

First Embodiment

Figure 3:
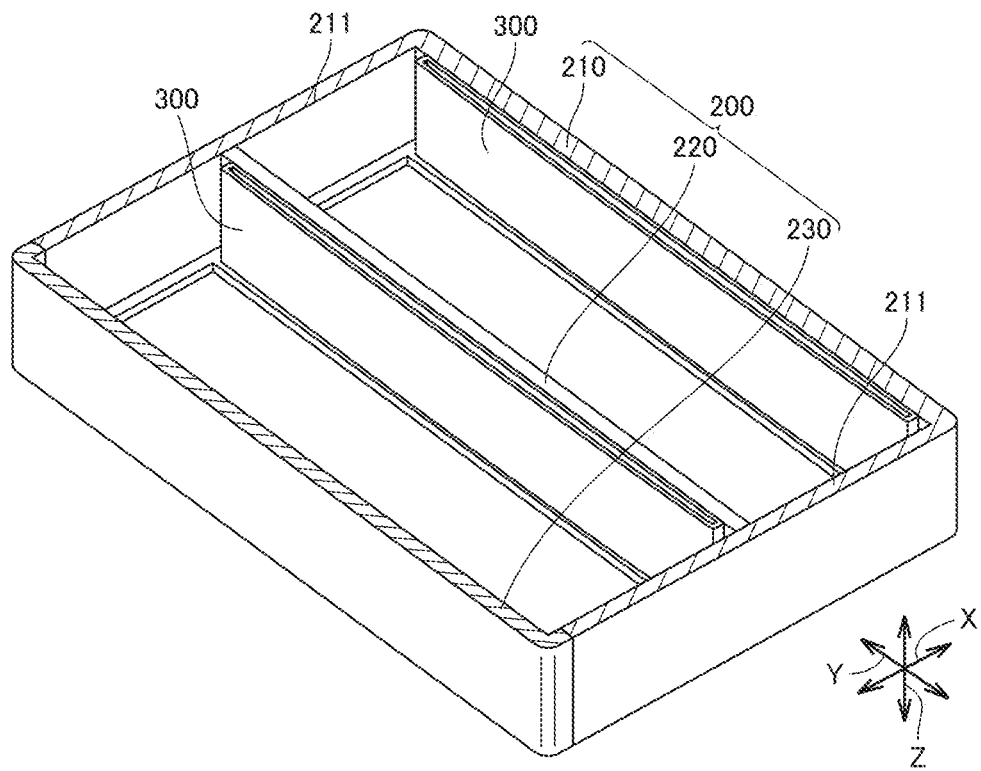
FIG. 3 is a cross sectional perspective view showing inside of a case of the battery pack according to the first embodiment.

FIG. 3 is a cross sectional perspective view showing inside of a case 200 of a battery pack 1 according to a first embodiment. In FIG. 3, the top surface portion of case 200 is not shown. As shown in FIG. 3, case main body 210 has supporting portions 211. Supporting portions 211 are provided at both end portions of case main body 210 in the Y axis direction. Supporting portions 211 are in direct abutment with main surfaces 112A of battery cells 110 located at both end portions of battery module 100 in the Y axis direction, so as to support battery module 100 along the Y axis direction.

Battery module 100 can be biased along the Y axis direction by each of supporting portions 211 itself being slightly deformed. The deformation may be facilitated in the Y axis direction by providing, for example, a cavity (not shown) in case main body 210 including supporting portion 211 so as to reduce the thickness of supporting portion 211.

When inserting battery module 100 into case main body 210 along the X axis direction, compression force is applied onto battery module 100 along the Y axis direction. On this occasion, battery module 100 can be compressed as a whole in the Y axis direction by, for example, providing a compressible material, together with a separator, between battery cells 110. When the compression force is gradually unloaded after battery module 100 is inserted into case main body 210, the length of compressed battery module 100 in the Y axis direction returns to its original length, with the result that battery module 100 presses the inner surface of case main body 210 in the Y axis direction. Reaction force against the pressing force serves as supporting force by which case main body 210 supports battery module 100.

During use of battery module 100, accommodation case 112 may be expanded due to a factor such as gasification of the electrolyte solution in accommodation case 112 of battery cell 110. Pressing force from battery module 100 to case main body 210 due to the expansion and reaction force thereagainst can also contribute to supporting of battery module 100 by case main body 210.

By bringing main surface 112A of battery cell 110 into direct abutment with case main body 210 for the sake of restraint in the Y axis direction, the plurality of battery cells 110 can be restrained in the Y axis direction without providing an end plate and a restraining member. As a result, the size of battery pack 1 can be reduced.

Further, by restraining battery module 100 by supporting portion 211 of case main body 210, each battery cell 110 can be precisely positioned in the Y axis direction.

Further, as shown in FIG. 3, elastic members 300 (biasing means) are provided on the inner side surface of case main body 210 and on partition member 220.

Figure 4:
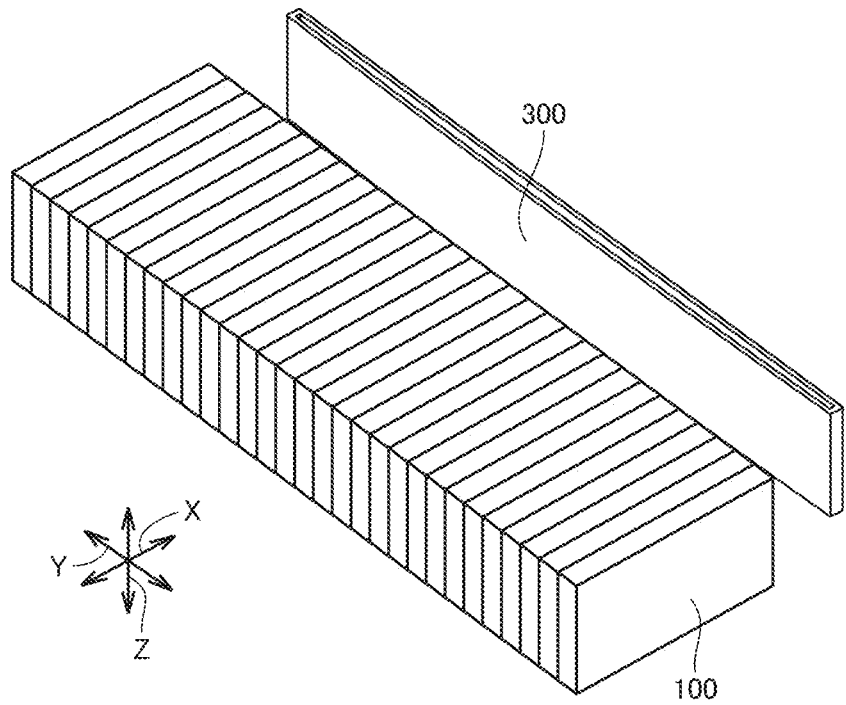
FIG. 4 is a perspective view showing the battery module and an elastic member in the battery pack according to the first embodiment.

FIG. 4 is a perspective view showing battery module 100 and elastic member 300 in battery pack 1 according to the present embodiment. In the example shown in FIG. 4, elastic member 300 has substantially the same length as the length of battery module 100 in the Y axis direction, and is provided to face the side surface of battery module 100 (side surfaces 112D of accommodation cases 112 of the plurality of battery cells 110). That is, elastic member 300 is provided between the side surface of battery module 100 and the inner surface (first inner side surface) of case 200. Elastic member 300 biases battery module 100 toward an inner surface (second inner side surface) of case 200.

Examples of elastic member 300 usable herein include an insulative plate-shaped member capable of generating predetermined repulsive force, such as a polypropylene resin or an elastomer. Since elastic member 300 needs to move battery module 100 in the X axis direction, elastic member 300 needs to be capable of generating biasing force larger than frictional force that acts on each of main surfaces 112A of battery cells 110 at the both end portions of the module due to the restraint in the Y axis direction.

Since the plurality of battery cells 110 included in battery module 100 are biased toward the inner surface of case 200 in the X axis direction by elastic member 300, battery cells 110 are brought into abutment with the inner surface of case 200, thereby precisely positioning battery cells 110 in the X axis direction. As a result, unintended deformation of battery module 100 in which the plurality of battery cells 110 are stacked can be suppressed, thereby suppressing positional deviation of electrode terminals 111 of battery cells 110.

Further, since case main body 210 constitutes the top surface and bottom surface of case 200, bottom surface 112C of each battery cell 110 and the bottom surface of case 200 are brought into abutment with each other when inserting battery module 100 into case main body 210, thereby precisely positioning the plurality of battery cells in the Z axis direction.

Thus, according to battery pack 1 according to the present embodiment, battery cells 110 can be positioned precisely in the X axis direction, the Y axis direction, and the Z axis direction without decreasing workability.

Second Embodiment

Figure 5:
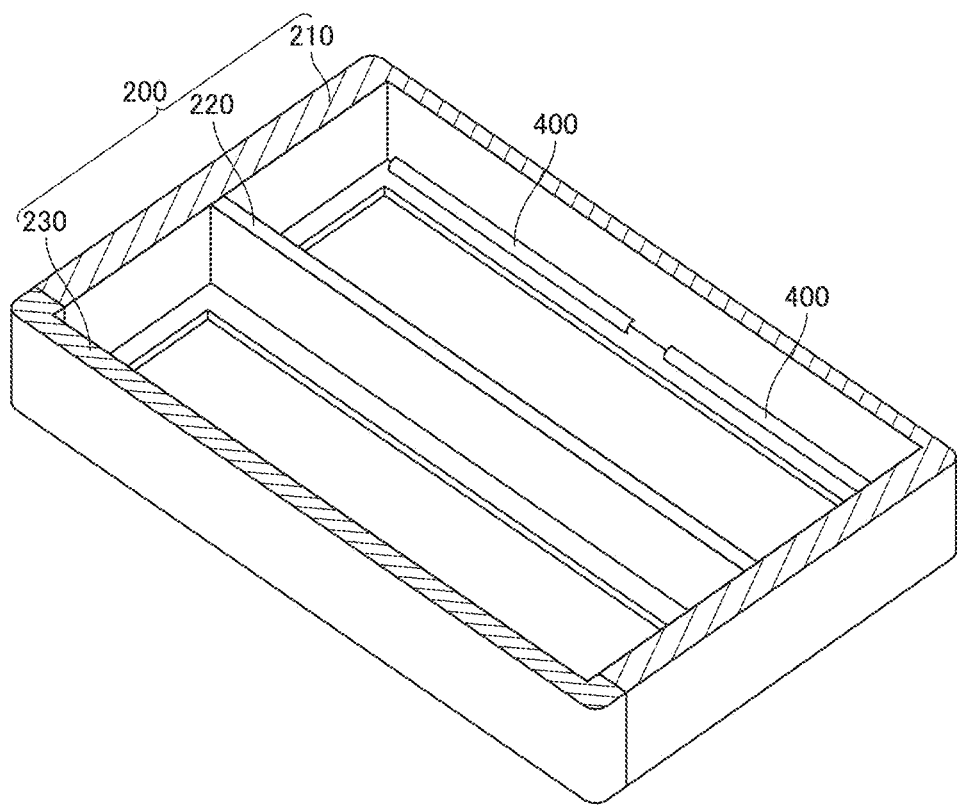
FIG. 5 is a cross sectional perspective view showing inside of a case of a battery pack according to a second embodiment.
Figure 6:
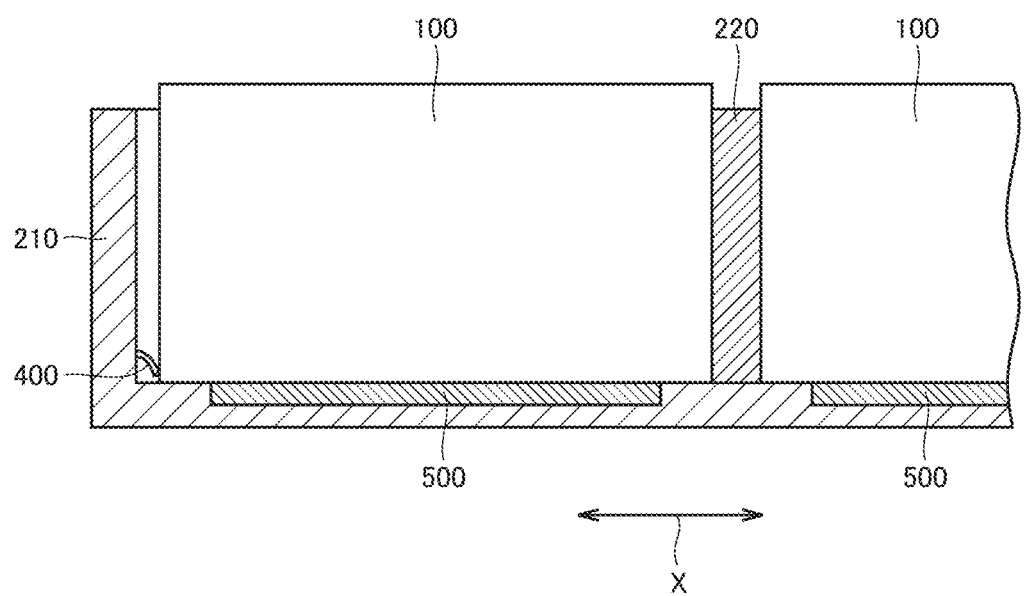
FIG. 6 is a cross sectional view showing the inside of the case of the battery pack according to the second embodiment.

FIG. 5 is a cross sectional perspective view showing inside of a case 200 of a battery pack 1 according to a second embodiment. In FIG. 5, the top surface portion of case 200 is not shown. FIG. 6 is a cross sectional view showing the inside of case 200, and FIG. 7 is a partial enlarged view of FIG. 6.

Figure 7:
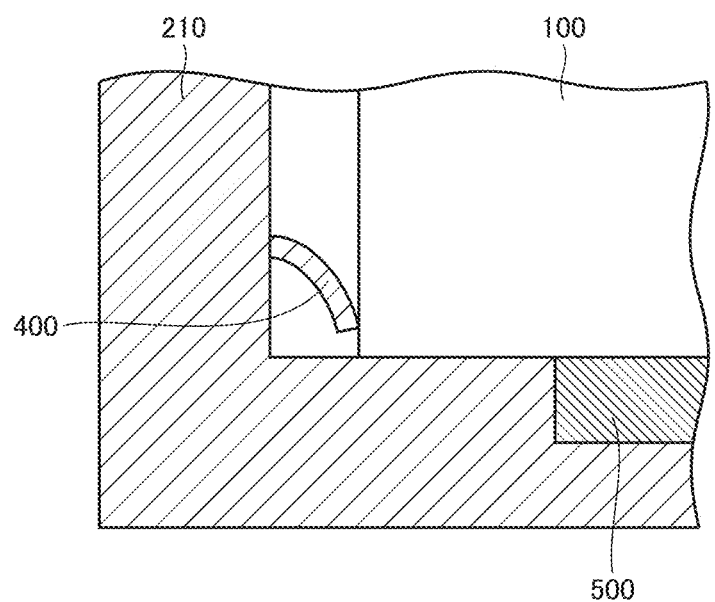
FIG. 7 is a partial enlarged view of FIG. 6.

Battery pack 1 according to the present embodiment is a modification of battery pack 1 according to the first embodiment, and has such a feature that, as shown in FIGS. 5 to 7, ribs 400 (biasing means) are provided on the bottom portion of case 200 instead of elastic member 300 in the first embodiment.

Each of ribs 400 is provided in abutment with a corner portion between bottom surfaces 112C and side surfaces 112D of the plurality of battery cells 110. That is, rib 400 is provided between the side surface of battery module 100 and the inner surface (first inner side surface) of case 200 to bias battery module 100 toward the inner surface (second inner side surface) of case 200.

Rib 400 may be formed in one piece with the members (case main body 210, partition member 220, and cover member 230) included in case 200, or may be formed as a separate member. In either case, rib 400 acts as a plate spring mechanism capable of generating biasing force that can move battery module 100 in the X axis direction irrespective of frictional force generated by the restraint in the Y axis direction.

At a region provided with no rib 400, a groove portion may be provided in the bottom surface of case 200 contiguous to the side surface of battery module 100 (side surfaces 112D of battery cells 110) so as to serve as a temporary storage portion for dew condensation water.

Since the plurality of battery cells 110 included in battery module 100 are biased toward the inner surface of case 200 in the X axis direction by ribs 400, battery cells 110 are brought into abutment with the inner surface of case 200, thereby precisely positioning battery cells 110 in the X axis direction. As a result, unintended deformation of battery module 100 in which the plurality of battery cells 110 are stacked can be suppressed, thereby suppressing positional deviation of electrode terminals 111 of battery cells 110.

As shown in FIGS. 6 and 7, a heat conducting member 500 is provided on the bottom side of each battery module 100. Heat conducting member 500 is provided between battery module 100 and case main body 210, and promotes transfer of heat generated in battery module 100 to case 200.

Configurations other than those above are the same as the configurations of battery pack 1 according to the first embodiment, and are therefore not described in detail repeatedly.

Thus, according to battery pack 1 according to the present embodiment, as with the first embodiment, battery cells 110 can be precisely positioned in the X axis direction, the Y axis direction, and the Z axis direction without decreasing workability.

Although the embodiments of the present invention have been described and illustrated in detail, it is clearly understood that the same is by way of illustration and example only and is not to be taken by way of limitation, the scope of the present invention being interpreted by the terms of the appended claims.

What is claimed is:

1. A power storage device comprising:
   a power storage module including a plurality of stacked power storage cells along a first direction; and
   a case having an inner space to accommodate the power storage module, wherein
   each of the plurality of stacked power storage cells includes
   a top surface provided with a positive electrode terminal and a negative electrode terminal which are arranged along a second direction being orthogonal to the first direction,
   a bottom surface opposite to the top surface along a third direction being orthogonal to the first and second directions,
   a main surface extending along a plane orthogonal to the first direction, and
   first and second side surfaces opposite each other in the second direction, contiguous to the top surface and the bottom surface, and extending along a plane orthogonal to the second direction,
   the case includes
   a main body provided with an opening on a side facing one of the first or second side surfaces of each of the plurality of stacked power storage cells,
   a cover provided over the opening,
   a first inner side surface facing the first side surfaces of the plurality of stacked power storage cells along the second direction, a second inner side surface facing the second side surfaces of the plurality of stacked power storage cells along the second direction, and
   first and second supporting portions facing the main surfaces of two end cells of the plurality of stacked power storage cells located at both end portions of the power storage module, the supporting portion restraining the plurality of stacked power storage cells in the first direction, and
   the power storage device further comprising biasing means configured to bias the plurality of stacked power storage cells along the second direction toward the second inner side surface of the case, the biasing means being provided between the first inner side surface of the case and the plurality of stacked power storage cells.

2. The power storage device according to claim 1, wherein the biasing means includes an elastic member provided between the first inner side surface of the case and the first side surfaces of the plurality of stacked power storage cells.

3. The power storage device according to claim 1, wherein the biasing means includes a rib in abutment with a corner portion between the first inner side surface and the bottom surfaces of the plurality of stacked power storage cells.

4. The power storage device according to claim 3, wherein the rib is formed in one piece with the case.

5. The power storage device according to claim 1, wherein the plurality of stacked power storage cells are lithium ion battery cells.

6. The power storage device according to claim 1, wherein the biasing means is configured to generate biasing force larger than frictional force between the first and second supporting portions and the main surfaces of the two end cells of the plurality of stacked power storage cells.

7. The power storage device according to claim 1, wherein the biasing means includes an insulative plate-shaped member extending along the first direction and biasing the plurality of stacked power storage cells in the second direction.

* * * * *